United States Patent Office 3,642,793
Patented Feb. 15, 1972

3,642,793
3-HYDROCARBON-4-TERTIARY AMINO METHYL SYDNONES
Yoshio Imashiro, Suita, and Katsutada Masuda, Ashiya, Japan, assignors to Takeda Chemical Industries, Ltd., Osaka, Japan
No Drawing. Filed Oct. 1, 1968, Ser. No. 764,306
Int. Cl. C07d *87/42*
U.S. Cl. 260—247.5 R                9 Claims

ABSTRACT OF THE DISCLOSURE

Sydnone derivatives of the formula

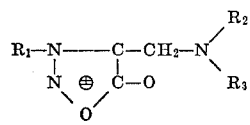

and pharmaceutically acceptable salts thereof, wherein $R_1$ is a hydrocarbon radical of 1 to 6 C-atoms; each of $R_2$ and $R_3$ is $C_1$–$C_5$ alkyl, $C_2$–$C_5$ alkenyl or $C_7$–$C_9$ aralkyl; or where

can be a 5- to 7-membered heterocyclic ring, are analgesics of low toxicity in mammals.

---

This invention relates to novel and useful sydnone derivatives, and to pharmaceutical compositions containing them.

More concretely, the novel sydnone derivatives comprise the compounds of Formula I and their pharmaceutically acceptable salts:

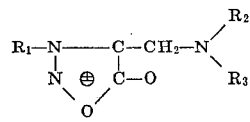

wherein $R_1$ is a hydrocarbon radical of one to six carbon atoms; each of $R_2$ and $R_3$ is alkyl of one to five carbon atoms; alkenyl of two to five carbon atoms; or aralkyl of seven to nine carbon atoms; or $R_2$ and $R_3$ together with the adjacent nitrogen atom stand for a five- to seven-membered heterocyclic ring.

The principal object of the present invention is to provide novel and useful sydnone derivatives of Formula I and pharmaceutically acceptable salts thereof.

A further object is to provide pharmaceutical compositions comprising at least one of the sydnone derivatives (I).

These new compounds (I) are produced by reacting a compound of the formula:

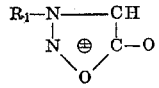                                      (II)

wherein $R_1$ is the same as defined above with formaldehyde and a secondary amine of the formula:

                                      (III)

wherein $R_2$ and $R_3$ are the same as defined above.

The hydrocarbon radical represented by $R_1$ in the Formulae I and II is exemplified by alkyl of one to six carbon atoms such as methyl, ethyl, n-propyl, isopropyl, n-butyl, isobutyl, n-pentyl, isopentyl, sec.-amyl, n-hexyl, isohexyl; alkenyl of two to six carbon atoms such as vinyl, allyl, butenyl, divinylmethyl; alicyclic radical of five- or six-membered ring such as cyclopentyl, cyclohexyl, cyclopentadienyl, cyclohexadienyl; aromatic radical such as phenyl; and these radicals may contain one or more substituents such as hydroxyl, methoxy, nitro group, halogen atoms (e.g. F, Cl, Br, I).

The alkyl represented by each of $R_2$ and $R_3$ in the Formulae I and III is exemplified by methyl, ethyl, n-propyl, isopropyl, n-butyl, isobutyl, n-pentyl, isopentyl, etc., the alkenyl is exemplified by vinyl, allyl, butenyl, etc., and the aralkyl is exemplified by phenyl-lower alkyl, e.g. benzyl, phenethyl, phenylpropyl, etc. When $R_2$ and $R_3$ taken together with the adjacent nitrogen atom form a five- to seven-membered heterocyclic ring, the ring radical is, for example, morpholino, piperidino, piperazino, pyrrolidino, or hexamethylenimino, and the radical may have, on its ring, one or more substituents such as alkoxy of one to five carbon atoms, alkyl of one to three carbon atoms, phenyl, halophenyl (e.g. chlorophenyl or fluorophenyl), benzyl, formyl, phenethyl, etc., which take no part in the present reaction.

The starting compound (II) is prepared, for example, by way of the following reaction sequence:

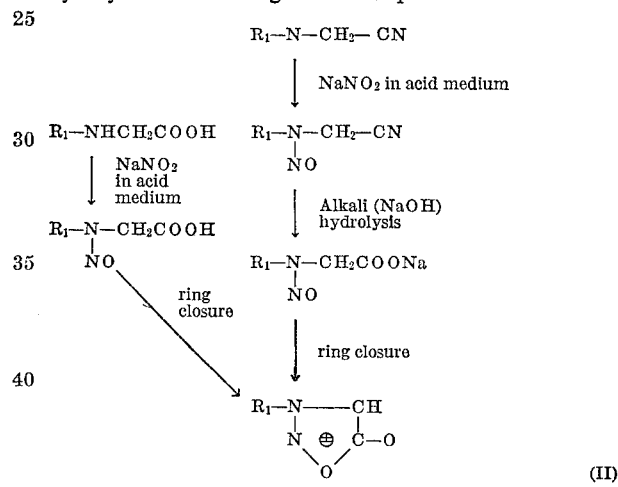

wherein $R_1$ is the same as defined above.

In the method of making the compounds of the present invention, formaldehyde can be employed as an aqueous solution, but is more advantageously used in the form of paraformaldehyde.

The reaction is carried out under acid conditions and a solvent such as water, alcohol, ether, organic acid, etc., or a mixture thereof, is employed, so long as it does not disturb the reaction, but a weak organic acid such as acetic acid, is more desirably employed for the present reaction, by itself or in admixture with other solvents.

When the starting compound (III) is used in the form of an acid addition salt thereof, there is no need to acidify the reaction solution.

Other optional reaction conditions such as the reaction temperature and the reaction time vary with the sydnones and the secondary amines employed, but the reaction is usually carried out at between about 0° C. and about 150° C. for from about 30 minutes to several hours. The formaldehyde and the secondary amine can be additionally supplied, if necessary.

The end product is usually obtained as free base and, if required, is converted into pharmaceutically acceptable salts thereof, such as hydrochloride, picrate, nitrate, sulfate, phosphate, toluenesulfonate, methanesulfonate, tartrate, citrate, methiodide, etc.

The new compounds (I) and pharmaceutically acceptable salts thereof of this invention have a strong analgesic activity, they have a rather low toxicity and little side effects, vis-a-vis mammals.

The compounds are effective against various aches such as pains after operation, toothache and stomach ache.

The superiority of the compounds of the present invention is demonstrated in the following tests.

Test 1.—Acute toxicity

A 10 w./v. percent solution of test compound (3-isopropyl - 4 - morpholinomethylsydnone) in physiological saline was administered orally in various dosages to groups of male mice, each group consisting of 5 heads weighing about 18 grams each. Thus-treated mice were kept at 23° C., 60% humidity, for 24 hours, and the median lethal dose was calculated by the Litchfield-Wilcoxon method (cf. The Journal of Pharmacology and Experimental Therapeutics, 96, 99 (1949)) from the number of surviving mice.

Median Lethal Dose $(LD_{50})=1425$ mg./kg.[1]

95% confidential limits: 1177.7–1724.3 mg./kg. On the other hand, $LD_{50}$ of aminopyrine obtained by the same procedure as above was 438 mg./kg.

Test 2.—Analgesic effect

The analgesic effect of the compounds was examined by the so-called writhing method (cf. R. Koster et al., Federation Proceeding 18, 412 (1959)).

A solution of test compound in physiological saline was administered orally in various dosages to groups of male mice, each group consisting of 5 heads weighing about 18 grams each.

30 minutes after administration, 0.1 ml./10 g. of body weight of 0.7% (by volume basis) acetic acid solution was administered intraperitoneally to each mouse, and its writhing was observed during 20 minutes after the administration of the acetic acid. The results are shown in Table I in comparison with the administration of the solvent (physiological saline) as a control. The percentages in the table are calculated on the basis of writhing frequency relative to that of the control.

TABLE I

| Test compound | Dose, mg./kg. body weight | Writhing frequency (percent) |
|---|---|---|
| None (control) | | 100 |
| 3-n-hexyl-4-morpholinomethylsydnone | 25 | 78 |
| | 50 | 34 |
| | 100 | 3 |
| 3-isopropyl-4-morpholinomethyl sydnone | 25 | 67 |
| | 50 | 12 |
| | 100 | 1 |
| Aminopyrine | 100 | 66 |

The sydnone derivatives of the present invention are useful as analgetic agents and are generally administered orally in the form of capsule, syrup, oil, tablet, etc., or by way of injection or as an ointment for topical use.

Pharmaceutical compositions containing one or more of the compounds of the present invention can be prepared according to any per se conventional method for the preparation of capsules, syrups, oils, injection, etc.

In the various aforesaid administration forms, the active ingredient can be present in a minor proportion relative to a major proportion of carrier, but the reverse relationship is also possible.

A typical effective daily dose of the sydnone derivatives of the present invention, when administered to the human adult, for example for the purpose of relieving toothache pain or the like, is usually about 0.1 gram to 3.0 grams, desirably 0.15 gram to 0.30 gram, although an increased or reduced daily dose is also effective on the symptoms.

In order to further illustrate the present invention, the following examples are given.

[1] Mg./kg.=milligrams per kilogram.

In these examples, temperatures are all in degree(s) centigrade, and the abbreviations "g." and "ml." should be read as "gram(s)" and "milliliter(s)" respectively. Percentages are by weight.

EXAMPLE 1

A mixture of 7.0 g. of 3-isopropylsydnone, 1.5 g. of paraformaldehyde, 4.0 g. of morpholine and 50 ml. of acetic acid is heated at 100° C. for 3 hours. After cooling, the acetic acid is distilled off under reduced pressure. The residue is dissolved in ethyl acetate and thereto is added dilute hydrochloric acid solution to transfer the objective compound to the aqueous phase. The aqueous phase is neutralized by sodium hydrogen carbonate to separate oily substance, which is extracted with ethyl acetate. After the extract is washed with water and dried, the solvent is removed to give 4.0 g. of 3-isopropyl-4-morpholinomethylsydnone as crystals melting at 82° C.

Elementary analysis.—Calculated for $C_{10}H_{17}N_3O_3$ (percent): C, 52.84; H, 7.54; N, 18.49. Found (percent): C, 52.84; H, 7.56; N, 18.56.

This compound is converted into its hydrochloride melting at 192° C. (with decomposition) by dissolving the former in a small amount of methanol, and adding thereto methanolic hydrochloric acid under cooling.

Elementary analysis.—Calculated for $C_{10}H_{17}N_3O_3 \cdot HCl$ (percent): C, 45.54; H, 6.88; N, 15.95. Found (percent): C, 45.30; H, 6.74; N, 16.02.

EXAMPLE 2

3.4 g. of 3-cyclohexylsydnone, 0.75 g. of paraformaldehyde, 2.0 g. of morpholine are added to a mixture of 5 ml. of ethanol and 5 ml. of acetic acid, and the whole mixture is heated at 95° C. for five hours. 5 ml. of acetic acid, 0.75 g. of paraformaldehlde and 20 g. of morpholine are added to the reaction mixture, and the heating is continued for further six hours. After cooling, the ethanol is distilled off under reduced pressure, and the residue is neutralized with an aqueous sodium bicarbonate solution, then the aqueous solution is extracted with ethyl acetate. The extract is dehydrated and concentrated to leave 5.9 g. of crude crystals, which are recrystallized from ligroin to give 2.0 g. of 3-cyclohexyl-4-morpholinomethylsydnone as colorless crystals melting at 127° to 128° C.

Elementary analysis.—Calculated for $C_{13}H_{21}N_3O_3$ (percent): C, 58.41; H, 7.92; N, 15.72. Found (percent): C, 58.37; H, 7.92; N, 15.74.

This compound is dissolved in a small amount of methanol, and thereto is added methanolic hydrochloric acid, whereby crystals separate out from the solution. The crystals are collected by filtration, and are recrystallized from methanol to give 3-cyclohexyl-4-morpholinomethylsydnone hydrochloride as colorless needles melting at 206° to 208° C. (with decomposition).

EXAMPLE 3

1.0 g. of 3-cyclohexylsydnone and 0.5 g. of paraformaldehyde are suspended in 10 ml. of ethanol, and thereto are added 1 ml. of piperidine and 3 ml. of acetic acid, then the mixture is heated at 100° C. for 10 hours. The ethanol and the acetic acid are distilled off from the reaction mixture under reduced pressure, and then the residue is purified by means of column chromatography on silica gel, using ether as the eluant. Evaporation of the solvent from the eluate gives crude crystals, which are recrystallized from ligroin to give 3-cyclohexyl-4-piperidinomethylsydnone as colorless crystals melting at 124° to 126° C.

Elementary analysis.—Calculated for $C_{14}H_{23}N_3O_2$ (percent): C, 63.37; H, 8.74; N, 15.83. Found (percent); C, 63.04; H, 8.74; N, 15.73.

In the same manner as in Examples 1 through 3, the following compounds are obtained:

3-cyclohexyl - 4 - morpholinomethylsydnone (M.P. 127°–128° C.; hydrochloride M.P. 206°–208° C.)
3-n-hexyl-4-morpholinomethylsydnone (M.P. 83°–85° C.)
3-phenyl-4-piperidinomethylsydnone (M.P. 135° C.)
3-phenyl-4-diethylaminomethylsydnone (M.P. 105° C.)
3 - phenyl-4-morpholinomethylsydnone (M.P. 129°–130° C.)
3-phenyl - 4-(4' - benzyl piperazino)methylsydnone (M.P. 143° C.)
3 - p-fluorophenyl - 4 - morpholinomethylsydnone(hydrochloride M.P. 198° C.)
3-n-butyl-4-morpholinomethylsydnone (M.P. 75° C.)
3-isobutyl-4-morpholinomethylsydnone (M.P. 95° C.)
3-sec.-butyl - 4 - morpholinomethylsydone(picrate, M.P. 199° C. with decomp.)
3-allyl-4-morpholinomethylsydnone (M.P. 87° C.)
3 - isopropyl-4-diallylaminomethylsydnone (picrate, M.P. 122°–123° C.)
3-isopropyl - 4 - dimethylaminomethylsydnone (picrate, M.P. 156°–158° C.)

Typical compositions comprising an active compound (I) according to the invention are:

Composition 1

| | Mg. per g. powder |
|---|---|
| (1) 3-cyclohexyl-4-morpholinomethylsydnone | 200 |
| (2) Lactose | 600 |
| (3) Starch | 200 |
| | 1000 |

All ingredients are thoroughly mixed, the resultant admixture then serving as an orally administrable powder.

Composition 2

| | Mg. per tablet |
|---|---|
| (1) 3-isopropyl-4-morpholinomethylsydnone | 250 |
| (2) Microcrystalline cellulose | 142 |
| (3) Calcium salt of carboxymethylcellulose | 20 |
| (4) Lactose | 70 |
| (5) Talc | 15 |
| (6) Magnesium stearate | 3 |
| | 500 |

(1) one half quantity of (2), and (4) are kneaded with methanol, and the mixture is dried under reduced pressure, then granulated. Remaining half of (2), (3), (5) and (6) are added to the granules and compressed into tablets. Thus-prepared tablets can further be coated with e.g. sugar.

Composition 3

| | Mg. per capsule |
|---|---|
| (1) 3-isopropyl-4-morpholinomethylsydnone | 250 |
| (2) Gelatin capsule | 55 |
| | 305 |

Pulverized compound (1) is filled into the gelatin capsule.

In the above-mentioned illustrations, 3-cyclohexyl-4-morpholinomethylsydnone and 3-isopropyl-4-morpholinomethylsydnone can be replaced by any other compound (I) or salt thereof of the present invention on the same molar basis.

What is claimed is:

1. A compound according to claim 9, wherein the sydnone derivative is in the form of pharmaceutically acceptable salt.
2. A compound according to claim 1, wherein the pharmaceutically acceptable salt is hydrochloride or picrate.
3. A compound according to claim 9, wherein $R_1$ is alkyl.
4. A compound according to claim 9, wherein $R_2$ and $R_3$ together with the adjacent nitrogen atom stand for morpholino.
5. 3-isopropyl-4-morpholinomethylsydnone.
6. 3-cyclohexyl-4-morpholinomethylsydnone.
7. 3-n-hexyl-4-morpholinomethylsydnone.
8. 3-isopropyl-4-diallylaminomethylsydnone.
9. A sydnone compound of the formula

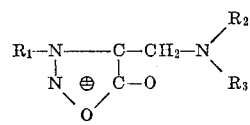

wherein $R_1$ is alkyl of one to six carbon atoms, alkenyl of two to six carbon atoms, cyclohexyl or phenyl or halogenated phenyl and each of $R_2$ and $R_3$ is alkyl of one to five carbon atoms or alkenyl of two to five carbon atoms or $R_2$ and $R_3$ together with the adjacent nitrogen atom stand for a six- or seven-membered heterocyclic ring selected from the group consisting of morpholino, piperidino, pyrrolidino, 4-benzyl piperazino and hexamethyleneimino.

References Cited

UNITED STATES PATENTS 3,280,121  10/1966  Giuseppe Palazzo __ 260—247.2

ALEX MAZEL, Primary Examiner

J. TOVAR, Assistant Examiner

U.S. Cl. X.R.

260—268, 294.7, 307 A; 424—248